E. J. BLISS.
SIZE GAGE FOR SHOES.
APPLICATION FILED DEC. 17, 1917.
1,318,835.
Patented Oct. 14, 1919.
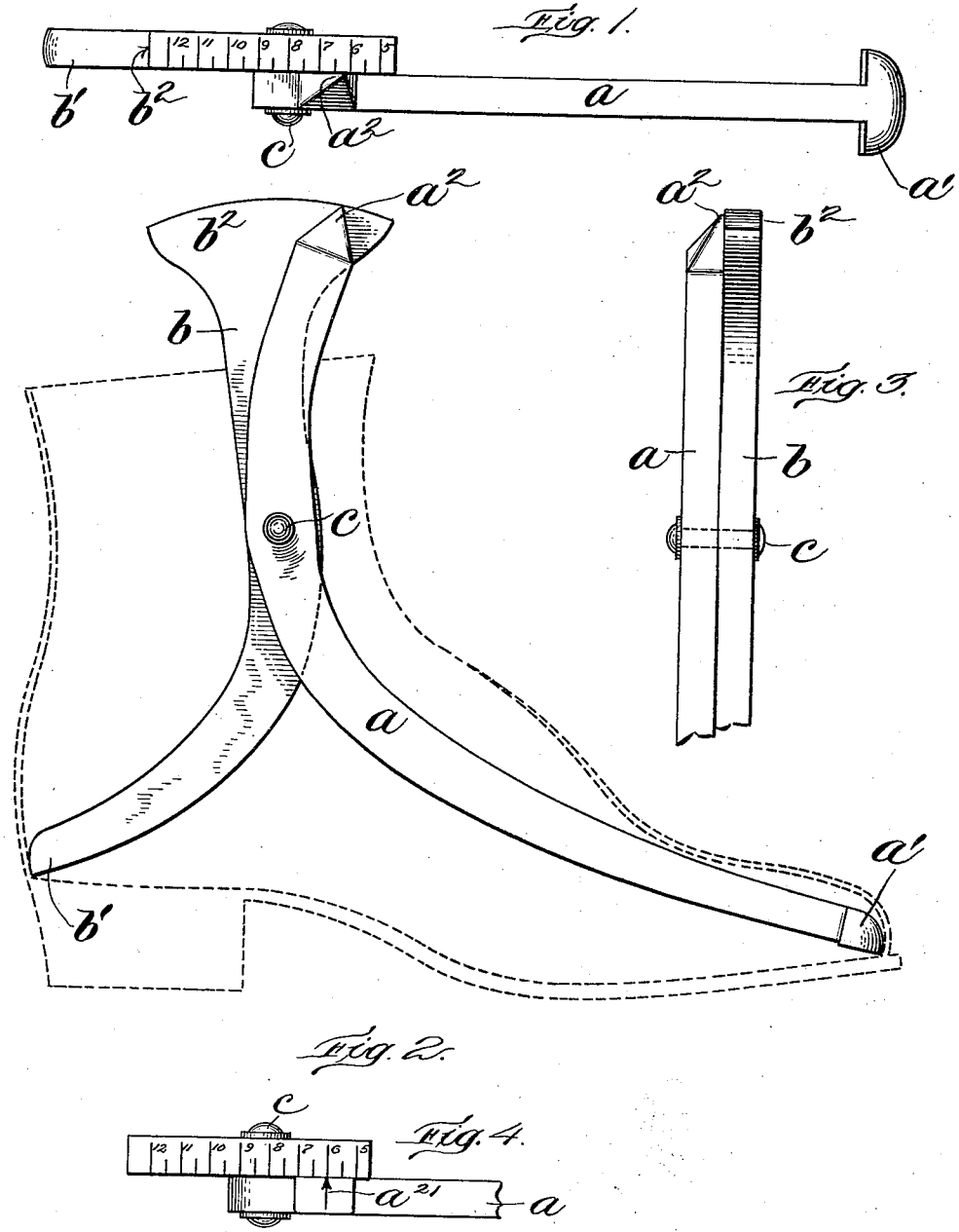

UNITED STATES PATENT OFFICE.

ELMER J. BLISS, OF BOSTON, MASSACHUSETTS.

SIZE-GAGE FOR SHOES.

1,318,835.  Specification of Letters Patent.  Patented Oct. 14, 1919.

Application filed December 17, 1917. Serial No. 207,406.

*To all whom it may concern:*

Be it known that I, ELMER J. BLISS, citizen of the United States, and resident of Boston, county of Suffolk, State of Massachusetts, have invented certain new and useful Improvements in Size-Gages for Shoes, of which the following is a specification.

This invention relates to gages for determining accurately the size of shoes for various purposes such as re-fitting the wearer with new shoes of the same size when the original size marks in the worn shoe have been obliterated, or for the purpose of ascertaining correctly the size of a shoe not bearing any size marks for the purpose of accurately selecting stock for repair or for other purposes.

Generally speaking the invention comprises a pair of pivotally connected arms properly shaped or curved to be readily inserted into the interior of the shoe, one of the arms being provided with a toe block for properly positioning the arm in the toe of the shoe, one arm also being provided with a size indicating scale to coördinate with a pointer on the other arm to correctly indicate the size length of the shoe.

This and other features of the invention will be particularly described in detail in the following specification and will be defined in the claims annexed hereto.

In the accompanying drawings I have illustrated a preferred form of construction embodying the principles of this invention in which—

Figure 1 is a plan view of the device as it would appear inserted in a shoe.

Fig. 2 is a side elevation showing the device in gaging position inside a shoe.

Fig. 3 is a front elevation of the upper ends of the gage.

Fig. 4 shows a modified form in which a measuring mark or line on the one arm is employed to indicate the size in coördination with the graduated scale.

Oftentimes it is desirable to ascertain with accuracy the true size of a boot or shoe which does not bear any size mark either because the size number has been lost or obliterated. Since different styles of shoe of the same internal length vary materially in their over-all and outside measurement, the attempt to ascertain the size by the use of a size stick applied to the outside of the shoe, is quite misleading and unreliable. The present invention is intended to afford a simple and convenient device which shall be absolutely reliable in ascertaining the correct length of any style of shoe.

In the practice of my invention according to the form illustrated in the drawings, I provide a bent or curved arm $a$ provided at its forward end with a transverse toe block $a'$ adapted to fit into the toe portion of the shoe. Near the outer end of this arm there is pivotally connected to it an arm $b$ having the opposite bend or curvature so that its lower end, as at $b'$, can be swung against the inside back surface or the counter of the shoe.

Either one of the arms, in this case the arm $b$, is provided with an elongated extension transverse to the pivotal axis as indicated at $b^2$ on the face of which are placed length indicating marks in the form of a graduated scale having preferably sub-divisions to indicate the half sizes. The other arm preferably terminates in a pointer $a^2$ whose tip or point is swingable to and fro along the edge of the graduated size scale.

The pivot pin $c$, the pointer $a^2$ and the graduated scale markings are so coördinated that when the arms are placed in proper gaging position inside the shoe, as illustrated in Fig. 2, the pointer registers with the proper interval on the scale to correctly indicate the length of the shoe.

In using the device care should be taken to press the toe block firmly against the extreme forward toe portion of the upper, and then with the toe engaging arm in that position the upper end counter engaging arm is swung forward until its lower end firmly engages the counter. With a properly laid-off scale the pointer will then indicate the true size of the shoe.

The gage may be of wood, metal or other suitable material.

It will of course be understood that the term "pointer" as used herein is not confined to a physically tapered member, but is intended to cover broadly any distinguishable or well known means of indicating location, such as a registering mark as indicated in Fig. 4.

What I claim is:

1. A size determining gage for shoes embracing in its construction two curved levers pivotally connected together at a point intermediate of their ends the lower arms of said levers being curved oppositely away from each other to engage respectively the back of the counter and the inside of the toe tip when the gage is inserted for measuring, the upper arms being located in juxtaposition to each other, one of said upper arms being provided with a size indicating dial portion for indicating in connection with the adjacent end of the other arm the correct size of the shoe, and a toe block shaped to conform approximately to the inside of the toe tip secured to the forwardly extending lever, substantially as described.

2. A size gage for determining the size length of a shoe embracing in its construction two oppositely curved levers pivotally connected intermediate of their ends the lower arms of said levers being of unequal length, the longer extending forwardly to engage the inside of the toe end of the shoe, the shorter arm extending rearwardly to engage the inside of the counter of the shoe, the upper arms of said levers being of substantially equal length and one of them being provided with a dial scale to indicate in coördination with the adjacent end of the companion arm the size measurement of the shoe, substantially as described.

In witness whereof, I have subscribed the above specification.

ELMER J. BLISS.

Copies of this patent may be obtained for five cents each, by addressing the "Commissioner of Patents, Washington, D. C."